United States Patent [19]

Vincent

[11] Patent Number: 5,303,743
[45] Date of Patent: Apr. 19, 1994

[54] THREAD PROTECTION SYSTEM

[76] Inventor: Larry W. Vincent, 965 Lakeview, Montgomery, Tex. 77353

[21] Appl. No.: 819,476

[22] Filed: Jan. 10, 1992

Related U.S. Application Data

[63] Continuation-in-part of Ser. No. 697,206, May 8, 1991, abandoned.

[51] Int. Cl.$^5$ .............................................. B65D 59/00
[52] U.S. Cl. ................................. 138/96 T; 138/89; 138/96 R
[58] Field of Search ............... 138/89, 96 R, 96 T, 138/109, 177, 178; 422/9

[56] References Cited

U.S. PATENT DOCUMENTS

| | | | |
|---|---|---|---|
| 2,118,073 | 5/1938 | Dittmeyer | 138/96 R |
| 2,630,368 | 3/1953 | Wachter et al. | 422/9 |
| 2,643,177 | 6/1953 | Wachter et al. | 21/2.5 |
| 2,826,222 | 3/1958 | Case | 138/96 R |
| 2,977,993 | 4/1961 | Scherer | 138/96 T |
| 3,000,402 | 9/1961 | Bowman | 138/96 T |
| 3,056,427 | 10/1962 | Higgins | 138/96 T |
| 3,104,681 | 9/1963 | Gray | 138/96 R |
| 3,574,312 | 4/1971 | Miller | 138/96 R |
| 3,936,560 | 2/1976 | Santurri et al. | 422/9 |
| 3,967,926 | 7/1976 | Rozenfeld et al. | 422/9 |
| 4,020,873 | 5/1977 | Palarino | 138/96 T |
| 4,101,328 | 7/1978 | Fieser et al. | 422/9 |
| 4,116,701 | 9/1978 | Conner | 422/9 |
| 4,210,179 | 7/1980 | Galer | 138/96 T |
| 4,308,168 | 12/1981 | Sato et al. | 422/9 |
| 4,438,783 | 3/1984 | Dreyfuss et al. | 138/96 T |
| 4,469,469 | 9/1984 | Kennedy | 138/DIG. 6 |
| 4,487,229 | 12/1984 | Dreyfuss et al. | 138/96 |
| 4,614,207 | 9/1986 | Steinhagen | 138/96 T |
| 4,757,595 | 7/1988 | Fraering | 138/96 T |
| 4,796,668 | 1/1989 | Depret | 138/96 T |

FOREIGN PATENT DOCUMENTS

| | | | |
|---|---|---|---|
| 84343672 | 8/1986 | Fed. Rep. of Germany | B65D 59/06 |
| 2167393A | 5/1986 | United Kingdom | B65D 55/02 |

OTHER PUBLICATIONS

General Electric Technical Report, "G–E Sealing Caps and Sleeves", COP544-1, Received in Division 52, Jun. 1947.

*Primary Examiner*—James E. Bryant, III
*Attorney, Agent, or Firm*—Ned L. Conley

[57] ABSTRACT

A corrosion inhibiting system for protection of the threads of oil country tubular goods, including a vapor phase corrosion inhibitor and a liquid phase corrosion inhibitor in water solution, and a transparent thread protector. The threads may be inspected for corrosion without removing the thread protector or the corrosion inhibitor, and the corrosion inhibitor may be left on the threads for use in combination with an anaerobic sealing compound.

13 Claims, 1 Drawing Sheet

THREAD PROTECTION SYSTEM

This is a continuation-in-part of copending application Ser. No. 07/697,206 filed on May 8, 1991 now abandoned.

FIELD OF THE INVENTION

This invention relates to a method and system for protecting pipe threads from corrosion, and in particular is directed to such a method and system for protection of oil field tubular goods, including tubing, drill pipe, casing and other apparatus having threaded connections. The invention includes the combination of a corrosion inhibiting composition and a novel thread protector.

BACKGROUND OF THE INVENTION

A major industry has developed in the protection of the threads of oil field tubular goods to prevent them from corroding during the period between manufacture and use, because of the high cost of such tubular goods and because of the importance of being sure that there are no defects in the threads which could cause them to leak after the pipe has been installed in a well. Oil well tubing often must withstand a pressure of hundreds or even thousands of pounds per square inch. A leak after the tubing is installed means the tubing must be pulled and repaired or replaced, at a cost of perhaps hundreds of thousands of dollars.

Pipe thread corrosion may be ordinary oxidation, or rust, or it may be caused or supplemented by microorganisms which feed on various materials on the surface of the thread and produce an acid which causes pitting of the threads. A variety of means have been used to prevent such corrosion, with questionable success. Commonly, API (American Petroleum Institute) Bulletin 5A2 pipe dope has been used, although it is low in corrosion inhibiting properties. This pipe dope is designed to be a thread compound, with lubricating and sealing properties. It is a thick grease-based material which contains lead and other filler materials to seal the helical passageway in the round profile threads commonly used on oil field tubular goods. Another material which has come into use is a wax-based material sold under the trademark KENDEX. Other, lighter materials, such as a light oil, are sometimes used if the pipe is to be used within a day or two of the time it is threaded. Such corrosion inhibitors are applied to the threads as soon as the pipe is threaded, in an effort to prevent flash rust which can occur in a very short time. Such flash rust is particularly objectionable on the high-precision threads known as "premium" threads which depend on a metal to metal seal.

After the corrosion inhibitor has been applied to a newly machined thread, the thread is further protected by screwing on a cover known as a thread protector. Thread protectors may be made of metal or plastic, or combinations of metal and plastic, and are constructed to protect the threads against impact damage when the pipe is accidentally dropped or bumped. Many thread protectors, aptly called "dust covers" in the field, are loose fitting and are of no value in keeping moisture away from the threads. Some, however, are cup-shaped, i.e. they include an end cover to close the end of the pipe, and some are also snug fitting and include moisture seals in an effort to improve corrosion protection.

In the manufacture of threaded tubular goods, the threading machines use a water-based cutting fluid. After threading, the cutting fluid is either wiped off or blown off with air, the "Corrosion inhibitor" is immediately applied, and thread protectors are put on. The pipe is then put in a pipe storage yard, usually exposed to the elements, until it is needed. The pipe may remain in the storage yard for a year or more, depending upon demand. It is during this period that protection of the threads against corrosion is most critical.

However, the oil, grease or wax-based materials which have previously been used to inhibit corrosion have some major drawbacks. The manufacturing operation, and even the methods used to clean the cutting fluids from the threads, necessarily leave some water on the threads, as well as some organic and sulfur compounds, and often microbes which can feed on the organic and sulfur-containing materials and excrete acids. The grease and wax-based materials previously used do not absorb or remove the water, but instead enclose it on the surface of the threads, leaving oxygen and microbes in contact with the threads to do their damage.

Because of this, if the pipe, with corrosion inhibitor and thread protectors in place, stays in a storage yard for more than about 60-90 days, it is desirable to inspect the threads to be sure that corrosion has not begun. This is done by removing the thread protectors, cleaning off the corrosion inhibiting material with a solvent, steam or some mechanical means, inspecting the threads, reapplying corrosion inhibitor, and either applying new thread protectors or cleaning and reapplying the ones previously used. As long as the pipe is in the yard, this process should be repeated every 60-90 days to ensure against thread corrosion.

This inspection process is expensive in the cost of the corrosion inhibitor and thread protectors, but more importantly in the cost of manpower for cleaning and retreating the threads. Moreover, every time the lead-containing API dope is cleaned off, there is a contamination problem which must be dealt with. It has been estimated that as much as two million pounds of lead are deposited on the ground each year through this process alone. Kendex and other inhibitors previously used are cleaned off with solvents, such as naphtha, diesel fuel or other petroleum-based materials which flow onto the ground and cause a contamination problem.

When the pipe is finally sent to a rig for installing in a well, it is necessary to again remove the thread protectors, clean the threads, inspect for corrosion, apply a thread sealant, and then make up the joints for installation in the well. Such materials as the API pipe dope and Kendex are not compatible with the new anaerobic sealants used as thread joint compounds, such as those disclosed in U.S. Pat. No. 4,183,714, one embodiment of which is manufactured by Loctite Corporation of Newington, Conn., and sold under the trademark SEAL-LUBE. It is necessary to remove the grease or wax based material and thoroughly clean the threads before this type of sealed is used.

Others have recognized the problem with the materials commonly used as corrosion inhibitors on oil field tubular goods, and have proposed solutions. Levesque, in an article entitled "Rust-inhibition fluids protect OCTGs in storage", published in WORLD OIL, March, 1985, discussed the use of tin or zinc plating or phosphate coatings for this application. He also pointed out the desirability of non-metallic snug fitting thread protectors with moisture seals to reduce corrosion.

Vapor phase corrosion inhibitors are well-known for the protection of steel from corrosion during shipping and storage. Such inhibitors are described in U.S. Pat. No. 2,643,177 and 3,779,818 and in the Kirk-Othmer *Encyclopedia of Chemical Technology*, Vol. 7, pp. 137–138. These inhibitors produce a vapor which precipitates a very thin film which is adsorbed on exposed surfaces. Known vapor phase inhibitors include amine salts with nitrous or chromic acids, amine salts with carbonic, carbamic, acetic and substituted or unsubstituted benzoic acids, organic esters of nitrous, phthalic or carbonic acids, primary, secondary and tertiary aliphatic amines, cycloaliphatic and aromatic amines, polymethylene amines, mixtures of nitrites with urea, urotropine and ethanolamines, nitrobenzene and 1-nitronaphthalene. Two common vapor phase inhibitors are dicyclohexylamine nitrite and cyclohexylamine carbonate. However, both of these inhibitors have some degree of toxicity, and various non-toxic proprietary compositions have therefore been produced and are in use to provide corrosion protection. One of those compositions is sold under the trademark Cortrol VCI, and is manufactured by Corless North-America, Inc. of Stanford, Conn. Cortrol VCI is a water soluble mixture of sodium benzoate and approximately 15% to 25% alkylated sodium benzoate, containing trace amounts of water and amine salts. Such a material may be made by the partial oxidation of coal tar distillates which contain mixtures of toluene, xylene and other alkylated benzenes to form benzoic acid and alkylated benzoic acid, followed by reaction with sodium hydroxide or sodium carbonate.

The vapor phase inhibitors are intended to be used dry, but many of them will continue to provide some corrosion control when dissolved in water. Generally, however, when the surface to be protected is immersed in water, as in steel tanks or boiler tubes, liquid phase inhibitors, such as the water soluble inorganic and organic salts which create a passive surface on the metal, are used. Such liquid phase corrosion inhibitors are disclosed, for example, in U.S. Pat. No. 2,550,997, and include the nitrite salts of alkali metals, alkaline earth metals and aromatic, aliphatic and heterocyclic amines which are not subject to auto-decomposition at ambient temperature. Benzoic acid and its salts, such as sodium benzoate, potassium benzoate and ammonium benzoate, are also effective liquid phase inhibitors. Because of cost factors and availability, sodium benzoate, sodium nitrite and potassium nitrite are generally preferred.

SUMMARY OF THE INVENTION

It is an object of this invention to provide a method and system for protection of pipe threads from corrosion which eliminates the problem of contamination from removing corrosion inhibiting materials.

Another object of the invention is to provide a thread protection system which is environmentally safe, can be used without cleaning the pipe thread before making up joints, and which is less costly than systems previously used.

It is a further object of the invention to provide a thread protecting method and system which includes a combination of a thread protector and a corrosion inhibitor which allows inspection of threads for corrosion without disassembling the thread protector from the pipe and without cleaning the corrosion inhibitor from the threads.

Another object of the invention is to provide a transparent thread protector which allows inspection of pipe threads without removing the protector, and which has sufficient toughness and impact resistance to prevent damage to pipe threads if the pipe is accidentally dropped on the threads.

DESCRIPTION OF THE PREFERRED EMBODIMENTS

Figure 1:
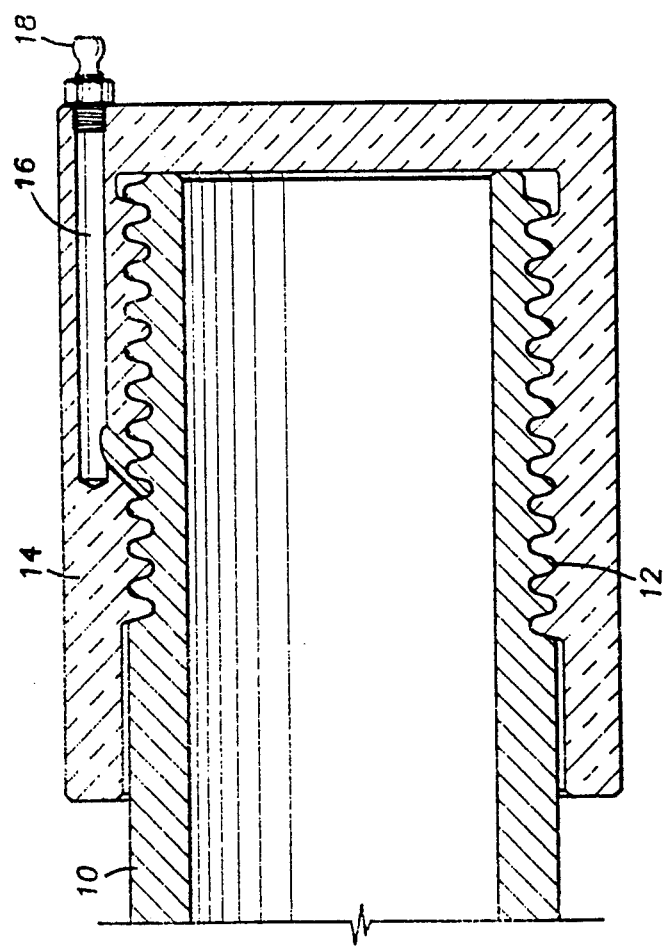
FIG. 1 of the drawing depicts a longitudinal sectional view of a tubing end and one embodiment of a thread protector of the invention.

According to this invention, pipe threads are protected from corrosion by applying to the threads an inhibitor which will not conceal corrosion of the threads, i.e. the inhibitor is transparent to corrosion. Preferably, a transparent plastic thread protector, i.e. one which allows visual inspection of the threads with the protector installed, is then screwed onto the threads. With this combination of elements, the threads may be periodically inspected without removing the thread protectors to determine whether any corrosion has begun. Any corrosion will be visible through the transparent thread protector and the inhibitor coating, so it is not necessary to remove the inhibitor from the pipe threads to inspect them. Thus, there is no contamination of the premises when this procedure is followed.

The corrosion prevention method and system of this invention preferably uses a unique inhibitor comprising a combination of a liquid phase inhibitor and a vapor phase inhibitor dissolved in water. The preferred inhibitor solution contains no grease or oil, but in fact includes a surfactant to facilitate close contact of the water based inhibitor solution with the pipe thread to be protected. However, other corrosion inhibitors which do not include components which will adversely affect the material of the thread protector, and which are effective inhibitors in the form of coatings which are transparent enough to allow inspection of threads for corrosion without removing the transparent thread protector, may also be used. For example, with some thread protector materials, a thin film of a light oil may be used. It is also preferred that such other inhibitors be compatible with the thread compound or sealant which will be used to make up the pipe when it is put into the well, so that it is not necessary to remove the inhibitor from the pipe threads before applying the thread sealant.

According to this invention the inhibitor used is transparent to corrosion, i.e. it is thin enough, or transparent enough, that corrosion of the pipe threads coated with the inhibitor is visible without removing the inhibitor, or the inhibitor changes color when the threads corrode. The preferred inhibitors of this invention are those which do not interfere with the effectiveness of the thread compound used to lubricate and seal the assembled pipe joints. The preferred inhibitors are most advantageously used on pipe threads which are to be assembled with anaerobic thread compounds, such as the product sold under the trademark SEALLUBE, but these inhibitors are also preferred when other thread compounds are used because of the many advantages of such inhibitors. The preferred inhibitors are environmentally safe, and their use saves a tremendous amount of labor and material cost, because it is not necessary to remove the inhibitor to inspect the pipe threads for corrosion. Furthermore, they are less expensive than other materials that are available.

The preferred inhibitors of this invention include a vapor phase inhibitor comprising a salt, preferably a sodium, potassium or ammonium salt, of benzoic acid and its alkylated homologs, such as may be produced by the oxidation of aromatic distillates of coal tar consisting primarily of toluene and other lower boiling point distillates. The sodium salt is preferred, because of its cost and availability, and its lack of toxicity. The inhibitor may consist primarily of sodium benzoate, but a substantial proportion of alkylated material, e.g. from about 5% to about 50% or more, is preferred. Such a product is sold under the trademark Cortrol VCI, by Corless North-America, Inc., and is known as a vapor phase inhibitor. Cortrol VCI contains from about 15% to about 25% of the alkylated material. In the process of this invention, the vapor phase inhibitor is applied in water solution, although it is an effective inhibitor as a solid.

Preferably, the vapor phase inhibitor is combined with a liquid phase inhibitor, a surfactant and, in the preferred embodiment, a mono- or poly-hydroxyl alcohol to lower the freezing point, all dissolved in water. The preferred liquid phase inhibitor for use with the vapor phase inhibitors described in the preceding paragraph is sodium benzoate.

A preferred composition is prepared by initially preparing a saturated solution of sodium benzoate in water, adding the surfactant, then dissolving Cortrol VCI in the solution until saturation is reached. The alcohol may be added to the solution at any convenient time. A suitable solution of the inhibitor of this invention may be made by preparing a saturated solution of sodium benzoate in water, requiring approximately 150 pounds of sodium benzoate in 36 gallons of water, adding a small amount, from about 1/10 pound to about 1 pound, of a liquid surfactant and then dissolving sufficient Cortrol VCI to create a saturated solution, about 55 pounds. Finally, about 30 pounds of propylene glycol are added.

A saturated, or nearly saturated, solution is preferred for general use, because of the reduced volume of material required, the more effective corrosion prevention obtained, and reduced cost of storage and transportation. However this inhibitor is effective in very small amounts, so that in some applications it may be desirable to use a much lower concentration of the liquid phase and the vapor phase inhibitors, for example as low as 2% to 10% by weight of each material. A slightly supersaturated solution may also be prepared, but this may result in some of the material precipitating out of solution in cold weather. In any case, it is desirable to have sufficient alcohol in the solution to minimize possible precipitation of solids, and to prevent freezing at ambient temperatures. If the material is to be used at temperatures above about five degrees Celsius, the alcohol may be omitted. Thus from zero to about 10% by weight of alcohol may be used. The amount of surfactant is not critical, the purpose being to improve the ability of the solution to form a film on the threads, and to provide sufficient surfactant to cut any oil or grease film on the threads so the inhibitor can achieve a good contact with the threads. Thus, as little as 0.1% of surfactant may be used.

Although the inhibitor composition just described is preferred, the invention is not limited to this particular composition, but extends to all inhibitors and combinations of inhibitors which will prevent corrosion of the threads for an extended period of time, such as up to one year, when exposed to the weather and enclosed within a thread protector, and which have the requisite transparency to allow inspection of the threads for corrosion without removing the inhibitor. The preferred inhibitors also function whether wet or dry. In particular, such preferred inhibitors include a combination of a vapor phase inhibitor and a liquid phase inhibitor, preferably both water soluble.

When a "dust cover" protector, i.e. one which does not fully seal in the threads or cover the end of the pipe, is used, the water in the inhibitor solution will usually evaporate, leaving a thin, white film deposited on the threads, the film containing both the vapor phase inhibitor and the liquid phase inhibitor. When a premium protector, i.e. one which completely encloses the threads and the end of the pipe, is used, the water base may not evaporate completely; nevertheless, the threads are protected by the synergistic effect of the two inhibitors.

The preferred inhibitor of this invention is effective even if the thread protector leaks a little and allows some moisture to contact the threads, as for example when it rains. The moisture will merely re-dissolve the inhibitor which is on the threads, so that the liquid phase inhibitor continues to provide protection.

The preferred inhibitor composition of this invention has a high pH, e.g. 8 or more, so it serves to neutralize any acid which may be on the threads or which may result from microbial action. In addition, the inhibitor contains no sustenance for microbes, so it is antimicrobial.

In use, the preferred inhibitor composition of this invention is usually sprayed or brushed on the threads 12 of the tubing 10 as shown in FIG. 1 of the drawing. Because it is water based, the inhibitor combines with any water that is present on the threads. Grease-based compounds previously used hold the oxygen-containing water against the threads and cause pitting and rusting damage. The inhibitor of this invention works wet or dry. The vapor phase inhibitor produces a monomolecular film at the surface of the metal which migrates to all recessed areas and cavities and binds to the outer valence molecule of the iron compound so that the iron acts as though it were inert to the oxygen molecule. The inhibitor dries to a thin white film. After the inhibitor is applied to the clean threads, a thread protector 14 is screwed on. The thread protector is preferably cup-shaped, i.e. with a closed end, as shown in the drawing.

Preferably the thread protector should be made of an impact resistant transparent material which has as least some resistance to ultra-violet degradation which undesirably affects transparency or toughness. It is important that the material used have sufficient transparency to permit viewing changes in the color of the enclosed threads, such as occurs when the steel corrodes, and that such transparency can be maintained for at least six months while the pipe using the protectors is stored outdoors. Suitable materials include styrene-butadiene copolymers, polycarbonates such as General Electric Company's Lexan 113, acrylics such as Rohm & Haas Company's Plexiglass, high density polyethylene, clarified polypropylene, polyvinyl chloride and the like. Satisfactory results may usually be obtained from materials which have a luminous transmittance of at least about 85% and a haze value of not more than about 5%, both as determined by ASTM Standard D1003. However, under some circumstances other materials will allow adequate viewing of the threads to achieve the objectives of the invention. If the material is one whose transparency is adversely affected by ultra-violet within a short time, an antioxidant may be included in the composition. Such materials are well known in the art, and those skilled in the art can readily select from those available. One suitable compound is sold by Phillips 66 Company under the name KR03, and comprises a copolymer of three parts styrene and one part butadiene with an anti-oxidant. This material has a total luminous transmittance of 89-91% and a haze value of 1 to 3%, both as determined by ASTM Standard D1003. The thread protectors can be made from recycled materials such as milk cartons and soft drink bottles. A preferred thread protector has a small amount, e.g. 5% to 10%, of vapor phase inhibitor incorporated in the polymeric material to add to the effectiveness of the inhibitor which has been applied to the threads. In some applications, this inhibitor alone may provide sufficient corrosion protection.

The thread protector may be molded, as by injection molding, or machined, or partially molded and partially machined. Because of the large number of different threads that must be provided for, and the cost of molds, it has been found to be economically advantageous to injection mold the part without threads, and then machine a thread profile to fit the desired application.

Such transparent thread protectors are also useful with other inhibitors which do not conceal the threads, such as light oils, and various commercial rust inhibitors such as that sold under the trademark WD-40. The butadiene-styrene copolymers, however, are adversely affected by such light oils.

It will be apparent that the material used for the thread protector should be one which is not so brittle that it is easily broken. The thread protector must have sufficient strength and impact resistance "to protect the thread and pipe end from damage under normal handling and transportation". American Petroleum Institute Specification 5CT, Section 7.5. To protect the thread and pipe end from damage when the pipe is accidentally bumped or dropped, greater strength and impact resistance are required. These characteristics of a protector for oil field tubing can be insured by a test in which a pipe nipple with a protector installed is placed on a support with the protector end angled upwardly at 45 degrees. A weight equal to the weight of a joint of pipe (a 30 foot length) is dropped on the protector from a height of two feet. This impact should not deform the end of the thread sufficient to make it more than 0.005 inch out-of-round. With oil field casing, which is much heavier than tubing, the drop height chosen is that height which will cause 0.005 inch out-of-round on unprotected pipe thread. Preferably, the protector is tough enough that it will not shatter under these tests. The wall thickness required for the wall 15 and the end 17 of the cup-shaped thread protector in order to obtain adequate toughness and strength to meet the foregoing requirements will necessarily vary depending on the size and weight of the pipe on which the thread protector is to be used and the strength and toughness of the particular material chosen. Those skilled in the art will be able to make these determinations without undue experimentation.

Advantageously, the thread protector may be provided with a port 16 fitted with a grease fitting 18 through which additional inhibitor may be applied from time to time during storage if inspection reveals loss or deterioration of the originally applied inhibitor. Since the thread protector is transparent, one may readily determine whether the inhibitor has penetrated to all the threaded area of the tubing.

Although the drawing shows a male pipe thread, female pipe threads may be similarly treated with the inhibitor of this invention and provided with a transparent thread protector.

To be sure that the inhibitor is working, periodically the threads should be inspected to make sure that they are not corroding. With the transparent thread protector, a visual inspection is possible without removing the thread protector. The preferred inhibitor of this invention dries to a thin white film, and any corrosion which may occur under this film will be apparent because the film is only a few molecules thick. Thus it is possible to inspect the threads for corrosion without removing the transparent pipe thread protectors.

Figure 3:
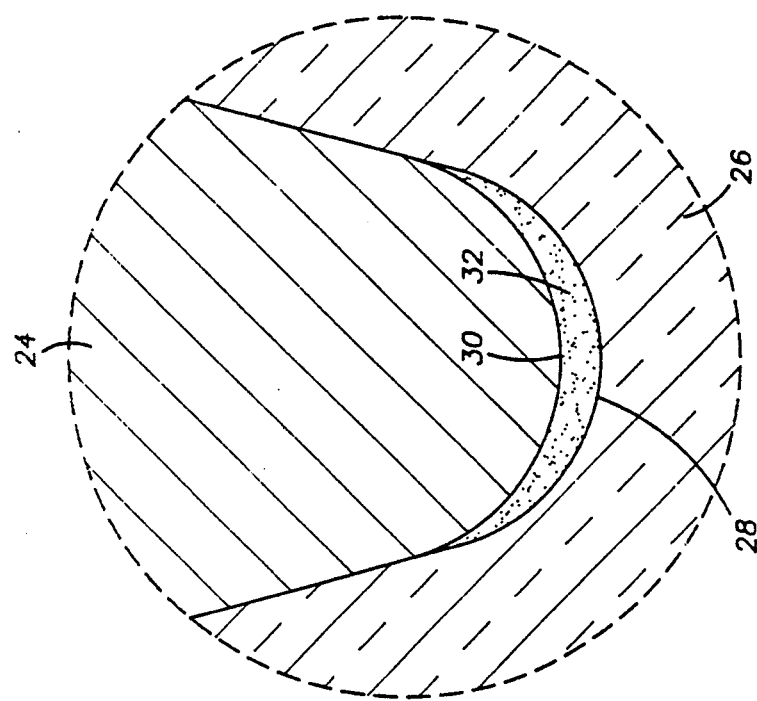
FIG. 3 shows an enlarged section of the threaded connection of FIG. 2.
Figure 2:
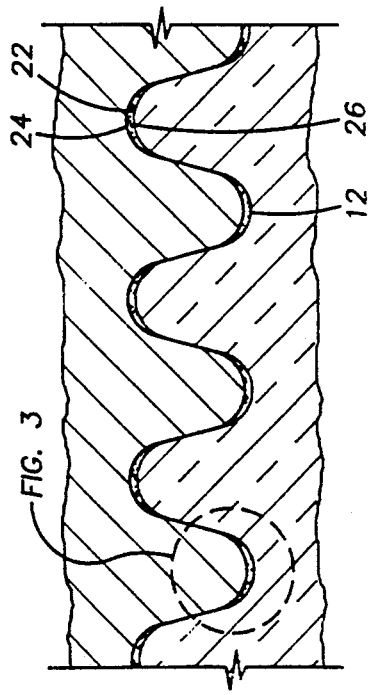
FIG. 2 depicts a fragment of a threaded connection between male and female threads using one embodiment of the invention.

When the pipe is ready for use, the thread protector is removed and a suitable thread compound or sealant is applied. Since the preferred inhibitor compositions are compatible with thread compounds, it is not necessary to clean the inhibitor from the threads before applying the thread compound. As shown in FIG. 2, when a connection is made up, there is a small space 22 between the mating threads 24, 26. The width of the space 22 is exaggerated in the drawing to more clearly show the materials in the space. As seen in FIG. 3, the inhibitor appears as a thin film 28, 30 on the surfaces of the threads, with the sealant 32 filling the space 22.

The transparent thread protectors of this invention have other beneficial uses, particularly in application to oil field tubular goods. For example, a corrosion warning indicator can be applied to the threads to indicate when the threads have been exposed to a condition which will likely lead to corrosion. Such a condition may arise when a load of pipe is being transported by barge to an offshore location, and is splashed with sea water. An indicator of an acid condition on the threads will show when enough sea water has entered the thread protector to create an acid condition. A reagent such as phenolphthalein or methyl orange will produce such an indication.

Several embodiments of the invention are disclosed, however the invention is not limited to these specific embodiments, but includes all variations included within the scope of the claims.

I claim:

1. In combination with an oil field tubular having a threaded end,
   a corrosion inhibitor coating the threaded end, said corrosion inhibitor being transparent to discoloration caused by corrosion of the threaded end, and
   a thread protector on said threaded end having a wall, including a cylindrical wall with threads engaged with the threads of the tubular, said wall having sufficient mechanical strength to protect the thread and the end of the tubular from impact damage during normal handling and transportation, said cylindrical wall also having sufficient transparency to permit viewing changes in color of the tubular threads engaged by the thread protector threads, and said cylindrical wall including means for maintaining said transparency for at least 60 days.

2. The combination of claim 1 wherein the corrosion inhibitor comprises a water solution of an inhibiting amount of a vapor phase inhibitor.

3. The combination as defined by claim 1 in which the cylindrical wall includes means for maintaining said transparency for at least six months while stored outdoors.

4. The combination of claim 1 wherein the thread protector has sufficient strength and impact resistance to protect the tubular from deformation of more than 0.005 inches out-of-round when a joint bearing the protector is dropped two feet.

5. The combination of claim 1 wherein the cylindrical wall of the thread protector has a luminous transmittance of at least about 85% and a haze value of not more than 5%, as determined by ASTM Standard D1003.

6. The combination of claim 1 wherein the tubular is casing and the thread protector has sufficient strength and impact resistance to protect the casing from deformation of more than 0.005 inch out-of-round when a joint of casing bearing the protector is dropped a distance which would case deformation of 0.005 inch out-of-round if the casing thread is unprotected.

7. The combination of claim 1 wherein the thread protector is cup-shaped.

8. An oilfield thread protector having a wall, including a cylindrical wall with threads engageable with cooperating threads of tubular goods, said wall having sufficient mechanical strength to protect the thread and the end of the tubular goods from impact damage during normal handling and transportation, said cylindrical wall having sufficient transparency to permit viewing changes in color of threads engaged by the thread protector threads, and said cylindrical wall including means for maintaining said transparency for at least 60 days.

9. A thread protector as defined in claim 8 in which the cylindrical wall has a luminous transmittance of at least about 85% and a haze value of not more than about 5%, as determined by ASTM Standard D1003.

10. The combination of claim 8 wherein the thread protector is cup-shaped.

11. An oilfield thread protector as defined in claim 8 in which the cylindrical wall includes means for maintaining said transparency for at least six months while stored outdoors.

12. A transparent tubing thread protector as defined by claim 8 having sufficient strength and impact resistance to protect the tubing from deformation of more than 0.005 inch out-of-round when a joint of tubing bearing the protector is dropped two feet.

13. A transparent tubing thread protector as defined by claim 8 having sufficient strength and impact resistance to protect the casing from deformation of more than 0.005 inch out-of-round when a joint of tubing bearing the protector is dropped a distance which would cause deformation of 0.005 inch out-of-round if the casing thread was unprotected.

* * * * *